United States Patent
Roy (10) Patent No.: US 6,967,941 B2
(45) Date of Patent: Nov. 22, 2005

(54) SYSTEM AND METHOD FOR INTER-DOMAIN MOBILITY MANAGEMENT

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 820 days.

(21) Appl. No.: 09/847,915

(22) Filed: May 2, 2001

(65) Prior Publication Data

US 2002/0018476 A1 Feb. 14, 2002

Related U.S. Application Data (60) Provisional application No. 60/201,195, filed on May 2, 2000.

(51) Int. Cl.[7] .................. H04L 12/28; H04L 12/66; G06F 15/16
(52) U.S. Cl. .................. 370/338; 370/401; 455/435.1; 709/249
(58) Field of Search .................. 370/328, 329, 370/338, 352, 389, 390, 395.1, 395.5, 395.6, 370/401, 432, 465, 466, 467; 455/410, 411, 455/422.1, 432.1, 432.2, 433, 435.1, 445; 709/227, 238, 249

(56) References Cited

U.S. PATENT DOCUMENTS

| | | | |
|---|---|---|---|
| 5,867,494 A | 2/1999 | Krishnaswamy et al. | |
| 6,154,463 A | 11/2000 | Aggarwal et al. | |
| 6,195,705 B1 | 2/2001 | Leung | |
| 6,201,805 B1 | 3/2001 | Strathmeyer | |
| 6,229,804 B1 | 5/2001 | Mortsolf et al. | |
| 6,240,449 B1 | 5/2001 | Nadeau | |
| 6,396,840 B1 * | 5/2002 | Rose et al. | 370/401 |
| 6,611,516 B1 | 8/2003 | Pirkola et al. | |
| 6,674,734 B1 | 1/2004 | Hsu et al. | |
| 6,785,223 B1 | 8/2004 | Korpi et al. | |
| 6,788,660 B1 | 9/2004 | Agrawal et al. | |
| 6,853,851 B1 * | 2/2005 | Rautiola et al. | 455/553.1 |
| 2004/0024901 A1 * | 2/2004 | Agrawal et al. | 709/238 |

* cited by examiner

*Primary Examiner*—Alpus H. Hsu (57) ABSTRACT

The present invention relates to a method and apparatus for inter-domain mobility management for a telephony network. The present invention also relates generally to the H.323 standard for transmitting audio and video data streams, and more particularly to extending the H.323 standard to support mobility in a multimedia communication system with services over packet-based networks.

40 Claims, 3 Drawing Sheets

Home Administrative Domain

Foreign Administrative Domain

FIG. 6

Home Administrative Domain

Foreign Administrative Domain

SYSTEM AND METHOD FOR INTER-DOMAIN MOBILITY MANAGEMENT

RELATED APPLICATIONS

This application claims the benefit of U.S. Provisional Application No. 60/201,195, entitled "Framework for H.323 inter-domain mobility management", filed May 2, 2000, and is also related to "H.323 Mobility Architecture for Terminal User and Service Mobility", U.S. patent application Ser. No. 09/642,279, filed Aug. 18, 2000; "Intelligent Signaling Scheme for Computer-Readable Medium for H.323 Mobility Architecture", U.S. patent application Ser. No. 09/642,298, filed Aug. 18, 2000 and issued May 4, 2004 as U.S. Pat. No. 6,732,177; "H.323 Back-End Services for Intra-Zone and Inter-Zone Mobility Management". U.S. patent application Ser. No., 09/801,914, filed Mar. 9, 2001; and "H.323 Mobility Protocol for Terminal User and Service Mobility", U.S. patent application Ser. No. 09/642,142, filed Aug. 18, 2000 and issued Aug. 10, 2004 as U.S. Pat. No. 6,775,255; all assigned to the assignee of the instant application, and the disclosure of each is hereby entirely incorporated herein by reference.

TECHNICAL FIELD

The present invention relates to a method and apparatus for inter-domain mobility management for a telephony network. The present invention also relates generally to the H.323 standard for transmitting audio and video data streams, and more particularly to extending the H.323 standard to support mobility in a multimedia communication system with services over packet-based networks.

BACKGROUND OF THE INVENTION

A framework on how the inter-domain communications need to be done in H.323 for mobility management has been provided in the context of the existing H.225.0 Annex G standard, as disclosed in ITU-T Recommendation H.225.0 Annex G (1999), "Communications Between Administrative Domains". The communication flows for mobility management considering the BE (Border Elements), Gatekeepers (GKs), Home location function (HLFs), and domains where each entity can be arranged in any logical architectural relationship: Centralized, Distributed, and/or Hybrid Architecture. ITU-T Recommendation H.323 describes terminals and other entities that provide multimedia communications services over packet based networks (PBN) which may not provide a guaranteed Quality of Service. H.323 entities may provide real-time audio, video and/or data communications. Support for audio is mandatory, while data and video are optional, but if supported, the ability to use a specified common mode of operation is required, so that all terminals supporting that media type can interwork.

The inter-domain mobility management of this invention needs to be independent of the underlying architectural configurations and is not "hard-wired" for any particular configuration of any architectural or functional entity as done in the prior art.

The new messages for mobility management within a domain has been proposed for H.225.0 RAS (Intra-domain communication) messages. Similarly, for inter-domain mobility management we need to extend H.225.0 Annex G, as disclosed in ITU-T Recommendation H.225.0 Annex G (1999), "Communications Between Administrative Domains." The new messages, such as, disclosed in R. R. Roy, AT&T, "H.323 Mobility Architecture and Protocol for Terminal, User, and Service Mobility," D-354, ITU-T SG 16 Q.13/16, WP2, Geneva, Switzerland, Feb. 7–18, 2000, the disclosure of which is entirely incorporated herein by reference, required for mobility binding and updating will also be applicable for inter-domain communication with additional parameters like hopcounts and others in the header as required per H.225.0 Annex G.

In addition, the existing H.225.0 RAS messages like LRQ (Location Request) such as, disclosed in R. R. Roy, AT&T, "H.323 Mobility Management Services, Scenarios, and Information Flows in an Administrative Domain," MD012, Ad Hoc Mobility Conference Call, February–May 2000, have been extended to manage mobility for intra-domain communications. Similarly, the messages like accessRequest and others of H.225.0 Annex G are also need to be extended for inter-domain mobility management as described in this embodiment. However, the mobility related parameters that specify the information related to the mobile entity used in the LRQ and call signaling messages of H.225.0 RAS/Q.931 also need to be passed to the accessRequest and other messages of H.225.0 Annex G while the mobile entity is visiting a foreign domain.

It is also the critical need for a mobile entity to have an option whether it will let others to know its present location in a foreign domain because of security or other reasons while it is away from its home domain. If the mobile entity does not want to make its address public while it is visiting in a foreign domain, the communications need to be done via mobile entity's home network address that it may want make to public.

Originally, the International Telecommunications Union (ITU) developed H.323 as an adaptation of H.320, which addresses videoconferencing over ISDN and other circuit-switched networks and services. ITU-T Recommendation H.320 describes terminals and other entities that provide multimedia communications services over circuit-switched networks which provide a guaranteed Quality of Service. H.320 entities may provide real-time audio, video and/or data communications. H.320 was ratified in 1990, and corporations expanded their networks to include Local Area Networks (LANs) and LAN gateways to the Wide Area Network (WAN). Then, H.323 was expanded beyond being an extension of H.320 so that H.323 now covers the corporate intranets and packet-switched networks in general. The ITU published a set of standards for multimedia communication over packet-based networks (PBNs) under the H.323 designation, which includes standards for data channels, monitoring channels, and control channels. It includes provision of real-time audio, video and/or data communications. The H.323 components defined by the standard include: terminals, gateways, gatekeepers and multipoint control units (MCUs). The terminals provide real-time communications, must support audio/voice communications and optionally s support data and video. The most common H.323 terminals are the applications that run on a personal computer (PC). H.323 gateways provide services to H.323 clients and allow communication with non-H.323 entities, such as communication between H.323 terminals and telephone in a circuit-switched network. Gatekeepers provide call control services for H.323 endpoints, e.g., address translation and bandwidth management. Gatekeepers are optional in the H.323 standard, but, if they are present, the endpoints must use the services of the gatekeepers. The H.323 standard specifies certain mandatory services that gatekeepers, if utilized, must provide. The multipoint control units provide support for conferences of three or more endpoints by managing conference resources, manage negotiations between the endpoints to specify which audio or video code(s) to use and may manage the media stream. The H.323 standard defines how audio and video conferencing systems communicate over packet-switched networks defines call control and management practices for point-to-point and broadcast/multicast/unicast multipoint conferences, addresses QoS issues with a centralized gatekeeper that LAN administrators use to manage media traffic, bandwidth and user participation, and describes functionality that allows calls to connect from the LAN to the Public Switched Telephone Network (PST) as well as to other H.32×standards-based terminals.

In version 2 of the H.323 standard, video and audio data streams are compressed and packetized in accordance with a real-time transport protocol (RTP/RTCP) standard from the Internet Engineering Task Force (IETF) and are used to support video conferencing and other communications over the Internet. Packets include data and header information which facilitates detection of packet loss, detection of packet status and synchronization of the packets. The video data streams may use H.261, H.262, or H.263 protocols. Audio data streams may use G.711, G.722, G.723.1 G.728 or G.729 protocols. Generally, the H.323 standard supports teleconferencing in networks that utilize TCP/IP, such as, for example, the Internet.

The H.323 system supports interoperability and assumes that users, terminals, and services are fixed. If an H.323 terminal is moved form one network to another, its point of attachment or network address changes. In this situation, the address of the mobile terminal needs to be resolved to set up a new call or continue a same call. Thus, there is a need for an H.323 mobility architecture that provides for terminal, user and service mobility for inter-domain mobility management.

SUMMARY OF THE INVENTION

The present invention provides an H.323-based mobility protocol for real-time inter-domain mobility management for a telephony network between the administrative domains.

Therefore, in one aspect the invention is an inter-domain mobility management method, comprising:

(a) a mobile H.323 entity communicating information related to the mobile entity with a first gatekeeper in a first administrative domain;

(b) said first gatekeeper being unable to verify information on said mobile H.323 entity and sending information to a first border element within said first administrative domain;

(c) said first border element communicating information with a second border element in a second administrative domain to resolve said information related to the mobile entity;

(d) said second border element communicates back with said first border element with information to resolve said information related to the mobile entity;

(e) said second border element accepting said resolved information related to the mobile entity and communicates said information with said mobile H.323 entity via said first gatekeeper.

In another aspect the invention is an inter-domain mobility management method, comprising:

(a) a mobile H.323 entity communicating information related to the mobile entity with a first gatekeeper in a first administrative domain having a first backend services;

(b) said first gatekeeper being unable to verify information on said mobile H.323 entity and sending information to a first border element within said first administrative domain;

(c) said first border element communicating information with a second border element in a second administrative domain to resolve said information related to the mobile entity;

(d) said second border element obtains information from a second backend services in said second administrative domain and communicates back with said first border element with information to resolve said information related to the mobile entity;

(e) said second border element accepting said resolved information related to the mobile entity and communicates said information with said mobile H.323 entity via said first gatekeeper.

In yet another aspect the invention is an inter-domain mobility management method, comprising:

(a) a mobile H.323 entity communicating information related to the mobile entity with a first gatekeeper in a first administrative domain having a first backend services;

(b) said first gatekeeper being unable to verify information on said mobile H.323 entity and sending information to a first border element within said first administrative domain;

(c) said first border element communicating information with a first backend services to resolve said information related to the mobile entity, wherein said first backend services is shared with both said first administrative domain and a second administrative domain;

(d) said second border element obtains information from said first backend services in said first and said second administrative domain and communicates it back to said first border element with information to resolve said information related to the mobile entity;

(e) said second border element accepting said resolved information related to the mobile entity and communicates said information with said mobile H.323 entity via said first gatekeeper.

In still another aspect the invention is an inter-domain mobility management method, comprising:

(a) a mobile H.323 entity communicating information related to the mobile entity with a first gatekeeper in a first administrative domain having a first backend services;

(b) said first gatekeeper being unable to verify information on said mobile H.323 entity and sending information to a first border element within said first administrative domain;

(c) said first border element communicating information with a second border element in a second administrative domain to resolve said information related to the mobile entity;

(d) said second border element obtains information from a second backend services in said second administrative domain via at least one gatekeeper in said second administrative domain and communicates back with said first border element with information to resolve said information related to the mobile entity;

(e) said second border element accepting said resolved information related to the mobile entity and communicates said information with said mobile H.323 entity via said first gatekeeper.

In still yet another aspect the invention is an inter-domain mobility management method, comprising:

(a) a mobile H.323 entity communicating information related to the mobile entity with a first gatekeeper in a first administrative domain having a first home location function;

(b) said first gatekeeper being unable to verify information on said mobile H.323 entity and sending information to a first border element within said first administrative domain;

(c) said first border element communicating information with a second border element in a second administrative domain to resolve said information related to the mobile entity;

(d) said second border element obtains information from a second home location function in said second administrative domain and communicates back with said first border element with information to resolve said information related to the mobile entity;

(e) said second border element accepting said resolved information related to the mobile entity and communicates said information with said mobile H.323 entity via said first gatekeeper.

In yet another aspect the invention is an inter-domain mobility management method, comprising:

(a) a mobile H.323 entity communicating information related to the mobile entity with a first gatekeeper in a first administrative domain having a first home location function;

(b) said first gatekeeper being unable to verify information on said mobile H.323 entity and sending information to a first border element within said first administrative domain;

(c) said first border element communicating information with a second border element in a second administrative domain to resolve said information related to the mobile entity;

(d) said second border element obtains information from a second home location function in said second administrative domain via at least one gatekeeper in said second administrative domain and communicates back with said first border element with information to resolve said information related to the mobile entity;

(e) said second border element accepting said resolved information related to the mobile entity and communicates said information with said mobile H.323 entity via said first gatekeeper.

In still another aspect this invention is an H.323-based mobility protocol for real-time mobile multimedia communications and conferencing over packet-based networks by a Mobile Terminal/Node/Entity having a Home Gatekeeper/Home Database, comprising the steps of:

upon becoming mobile and initiating an H.323 communication that includes at least one of: audio, video and data, by the Mobile Terminal/Node/Entity, with respect to notification, one of:

providing, by at least one of a plurality of available H.323 Visiting/Foreign Gatekeepers in a first administrative domain, notification of H.323 mobility services availability by periodically broadcasting/multicasting/unicasting a Mobility Gatekeeper Advertisement; and where the Mobile Terminal/Node/Entity lacks notification of H.323 mobility services availability, broadcasting/multicasting/unicasting /sending, by the Mobile Terminal/Node/Entity, a message to the Home Gatekeeper/Home Location Database in a second administrative domain, which notifies H.323 Visiting/Foreign Gatekeepers that the Mobile Terminal/Node/Entity needs H.323 mobility services and notifying, by the H.323 Visiting/Foreign Gatekeepers, to the Mobile Terminal/Node/Entity of available H.323 Visiting/Foreign Gatekeepers within the first administrative domain;

registering, by the Mobile Terminal/Node/Entity, with a H.323 Visiting/Foreign Gatekeeper of the available H.323 Visiting/Foreign Gatekeepers that support H.323 mobility services; and providing, for the Mobile Terminal/Node/Entity by the H.323 Visiting/Foreign Gatekeeper with which the Mobile Terminal/Node/Entity is registered, support for the H.323 communication that includes at least one of: audio, video and data.

In yet another aspect this invention is a computer-readable medium having computer-executable steps for implementing, by a Mobile Terminal/Node/Entity, an H.323-based mobility protocol for real-time mobile multimedia communications and conferencing over packet-based networks wherein a plurality of H.323 gatekeepers provide notification of H.323 mobility services availability by periodically broadcasting/multicasting/unicasting a Mobility Gatekeeper Advertisement, comprising the computer-executable steps of:

where the Mobile Terminal/Node/Entity becomes mobile and initiates an H.323 communication that includes at least one of: audio, video and data, by the Mobile Terminal/Node/Entity, with respect to notification, one of:

providing, by at least one of a plurality of available H.323 Visiting/Foreign Gatekeepers within a first administrative domain, notification of H.323 mobility services availability by periodically broadcasting/multicasting/unicasting/sending a Mobility Gatekeeper Advertisement; and where the Mobile Terminal/Node/Entity lacks notification of H.323 mobility services availability, broadcasting/multicasting/unicasting/sending, by the Mobile Terminal/Node/Entity, a message to the Home Gatekeeper/Home Location Database in a second administrative domain, which notifies H.323 Visiting/Foreign Gatekeepers that the Mobile Terminal/Node/Entity needs H.323 mobility services and notifying, by the H.323 Visiting/Foreign Gatekeepers, to the Mobile Terminal/Node/Entity of available H.323 Visiting/Foreign Gatekeepers within the first administrative domain;

registering, by the Mobile Terminal/Node/Entity, with a H.323 Visiting/Foreign Gatekeeper of the available H.323 Visiting/Foreign Gatekeepers that support H.323 mobility services; and providing, for the Mobile Terminal/Node/Entity by the H.323 Visiting/Foreign Gatekeeper with which the Mobile Terminal/Node/Entity is registered, support for the H.323 communication that includes at least one of: audio, video and data.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION

The present invention provides for extending the H.323 standard to support mobility in a multimedia communication system with services over packet-based networks. The present H.323 standard is known to those skilled in the art and is hereby incorporated by reference. The invention supports extending H.323 to support mobility in a transport independent way, create new H.323 messages and/or message elements that needed to support mobility, and facilitate interoperability for implementation of H.323 mobility over specific networking environments such as wireless/PSTN-IP-LAN. The invention provides for extension to existing H.225.0 (H.323) messages to accommodate mobility. Messages are provided to facilitate mobility binding as the mobile entity moves form one place to another. H.323 mobility service varies from traditional services such as cellular wireless/PSTN, and mobile IP, mobility services in that the IETF=s mobile protocol may be modified to include an interworking function (IWF) to provide interoperability between the mobile H.323 system and the wireless-PSTN mobile network.

When a mobile unit implementing H.323 uses a packet-based network, e.g., the IP subnet, together with an H.323-based point of attachment (e.g., network point of attachment, zone, domain), the mobility information is managed via a gatekeeper. There may be a gatekeeper at the transmitting end and at the receiving end also. If necessary, the gatekeeper can also perform bandwidth management, address translation, maps LAN aliases to IP addresses, and sets up a real-time transport control protocol (RTCP) for exchanging status information between the transmitting end and the receiving end. A H.245 control channel is set up to provide control functions such as, for example, opening and closing data channels.

The functional requirements of H.323 mobility are primarily described at the H.323 application level as:

Terminal Mobility: the ability for a terminal to changes location, network point of attachment, and H.323 point of attachment and still be able to communicate. A fixed or mobile H.323 terminal must be able to reach an H.323 mobile user and vice versa. Conversations are provided even when the mobile terminal moves from one place to another with a different point of attachment or network address. Where desired, communications are also provided among the H.323 mobile users. Intra-zone, inter-zone (intra-domain) and/or inter-domain handoff is supported. Handoff between intra-zone, inter-zone (intradomain) and or inter-domain users is supported.

User Mobility: the ability for a user to maintain the same user identity on different terminals or terminal types. An H.323 user maintains the same identity and may receive the same or, where desired, different services even when the user moves. Service providers may be switched with the user maintaining the same identity.

Mobility Management: The H.323 mobility management is supported to provide registration, call establishment, roaming and handoff.

QoS Support: QoS service is maintained during intra-zone, inter-zone (intra-domain) and/or inter-domain roaming for the H.323 user.

Authentication and Security: Authentication and security mechanisms are provided in support of H.323 mobility.

Typically, a gatekeeper (GK) manages a zone. A zone is generally a collection of H.323 entities such as terminals, gateways (GWs) or interworking functions (IWFs) and multi-point controllers (MCs). Each H.323 entity has a unique network point of attachment or address, and each zone may contain many network points of attachment, subnets, or addresses under the management of a GK. For example, a zone many have multiple networks in the case of an IP, ATM, or other network. If a user or terminal moves within a zone, its network attachment or subnetwork address may also change.

A domain may consist of a single or of multiple zones. Thus, H.323 mobility is addressed in terms of zones and domains as well. If an H.323 user, entity or terminal crosses a zone boundary, such a change may be termed as a change of H.323 point of attachment because an H.323 gatekeeper manages the registration of all H.323 entities in a given zone. In addition, H.323 services are ensured during the call and between calls while users or terminals move from place to place.

Other terminology used herein is:

Discrete terminal mobility or roaming: the ability for a terminal to make discrete changes of physical location, i.e., to change location while no media streams are active.

Continuous terminal mobility or handover: the ability for a terminal to change location while media streams are active. Such a change may be seamless, i.e., without loss of data, or alternatively, may not be seamless, i.e., wherein some media stream data is lost.

Service mobility: the ability for a user to obtain a particular service independent of user and terminal mobility, i.e., wherein a foreign network has the means to obtain the parameters required for the service.

Network Point of Attachment: the attachment or address, e.g., an IP address, of an H.323 entity, e.g., terminals, MCUs, MCs, and/or GWs, to a network. Similarly, the network point of attachment for ATM and other network can also be defined. Each H.323 entity has at least one network address which uniquely identifies the H.323 entity on the network. The address is specific to the network environment in which the endpoint is located. Different network environments may have different network address formats. H.323 permits an endpoint to use different network addresses for different channels within the same call.

H.323 Point of Attachment: the gatekeeper with which an H.323 terminal, GW (IWF), MC, or MCU is Databased.

Mobile Entity: the H.323 entity that changes its point of attachment (network and/or H.323 point of attachment) from one attachment to another. A mobile entity can continue to communicate with other H.323 entities at any location as it moves from place to place.

Home GK: a gatekeeper in the mobile entity's home zone which performs the necessary management functions for departed mobile entities and maintains current location information for each. Any H.323 GK that provides the support for H.323 mobile entities can act as a home GK.

Home Network: the network in the mobile entity's home network and the network which has been declared by the mobile entity as its home network, e.g., an IP subnetwork in the home zone declared as a home network by a mobile entity.

Home Network Address: the address of the network point of attachment in the home network of a mobile entity, e.g., IP address (RAS transport address) in a home IP subnetwork. If the transport address contains the network address in addition to the TSAP, the home transport address will also contain the home network address.

Foreign GK: a gatekeeper on a mobile entity's visited- or visiting-zone which cooperates with the home GK to have the information related to the mobile entity while it is away from its home zone. Any H.323 GK that provides the support for H.323 mobile entities can act as a foreign GK.

Foreign Network: the network in the mobile entity's foreign zone where the said network has been declared by the mobile entity as its foreign network, e.g., an IP subnetwork in a foreign zone of a mobile entity.

Care-of Network Address: the address of the network point of attachment in a foreign network of a mobile entity, e.g., IP address (RAS transport address) in a foreign IP subnetwork. If the transport address contains the network address in addition to the TSAP, the care-of transport address will also contain the care-of network address.

Visiting GK: a foreign GK that the mobile entity is presently visiting, i.e., the mobile entity is currently residing within a foreign zone that is managed by a foreign GK.

Visited GK: the foreign GK that had been visited by the mobile entity previously.

Target GK: the foreign GK that the mobile entity intends to visit.

Target Network: the target network that the mobile entity intends to visit.

Mobile GK: either a home GK or a foreign GK.

Home Zone: a zone that is managed by a home GK of a mobile entity.

Foreign Zone: a zone managed by a foreign GK.

Visiting Zone: a zone other than a mobile entity's home zone in which the mobile entity is currently residing, i.e., a foreign zone in which the mobile entity is presently visiting.

Visited Zone: a zone other than a mobile entity's home zone that the mobile entity has visited previously, i.e., the foreign zone which had been visited by the mobile entity previously.

Target Zone: a zone other than a mobile entity's home zone that the mobile entity intends to visit.

Visiting Entity: a mobile entity that is residing in a visiting zone managed by a visiting GK.

Visiting Terminal: a mobile H.323 terminal that is residing in a visiting zone managed by a visiting GK.

Visiting User: a mobile H.323 terminal that is residing in a visiting zone managed by a visiting GK.

Visitor List: the list of mobile entities currently visiting a foreign zone.

GK Advertisement for Mobility Services: foreign gatekeepers advertise their presence by using a special message to provide services for mobile entities.

Care-of Address: the terminal address of the point of attachment, e.g., care-of network address of mobile entity or care-of address of a foreign GK where a mobile entity is residing.

There are two different types of care-of address: a foreign GK care-of address with which a mobile entity is Databased; a care-of network address which the mobile entity has associated with one of its own network interfaces, e.g., a temporary IP address of the visitor may be acquired dynamically using the Dynamic Host Configuration Protocol (DHCP).

Location Area: a location area may constitute a cell or a certain group of cells in a given geographical area that resides within a zone.

Administrative Domain: An administrative domain is a collection of H.323 entities administered by one administrative entity and may contain one or more gatekeepers (that is, one or more zones). It may also contain one or more border elements for communications between the domains. Like zone, an administrative domain can also be termed as home or foreign (visited, visiting, or target) domain.

Mobile H.323 (Mobile H.323 Protocol): the extended and existing H.323 /H.225.0/H.245 messages that are used to support mobility in H.323 are termed as mobile H.323 protocol or simply as mobile H.323.

Clearly, H.323 mobility provides two kinds of changes in point of attachment: changing Network Point of Attachment in H.323 to H.323 calls (it can also be termed as a part of change in H.323 point of attachment), and changing H.323 Point of Attachment (e.g., change in zone or domain). Broadly speaking, both kinds of change in attachment can be termed as change in H.323 point of attachment. The change of attachment can also occur during calls, i.e., handover, and between calls, e.g., roaming. A change in point of attachment, e.g., a change in IP address or a change in zone/domain boundary, may result in handover during the call.

Figure 1:
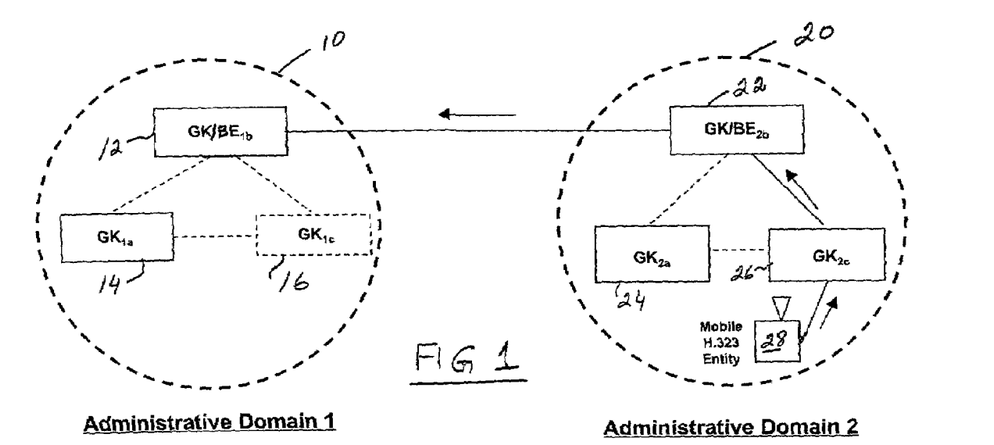
FIG. 1 illustrates an embodiment of the Inter-Domain Mobility Management system of this invention which illustrates communications between two administrative domains.

FIG. 1 illustrates an embodiment of the Inter-Domain Mobility Management system of this invention which illustrates communications between two administrative domains. Administrative domain 10 has a $GK/BE_{1b}$ 12, a $GK_{1a}$ 14 and a $GK_{1c}$ 16. Administrative domain 20 has a $GK/BE_{2b}$ 22, a $GK_{2a}$ 24 and a $GK_{2c}$ 26. A mobile H.323 entity 28 contacts the $GK_{2c\ b}$ 26 after moving from administrative domain 10 to administrative domain 20. Basically, the mobile entity 28 will discover the gatekeeper (GK) and then communicate with the gatekeeper (GK) for registration using the procedures as described in ITU-T Recommendation H.323, such as, $GK_{2c}$ 26 of the administrative domain 20 of a given administrative domain. The Gate-keeper (GK) 26, will find from the registration request message that the mobile user has moved from another administrative domain and needs to communicate with the other administrative domain. As result, $GK_{2c}$ 26 of the administrative domain 20 will then communicate with a border element (BE) 22 of that administrative domain 20 as appropriate depending on the needs dictated by the optimal routing so that minimal resources are used. The border element (BE) 22 will then communicate with another border element (BE) 12 of administrative domain 10 for resolving the information (e.g., address, registration, verification, authentication, etc.).

Gatekeeper discovery is the process an endpoint uses to determine which Gatekeeper to register with. This may be done manually or automatically. Manual discovery relies on methods outside the scope of this recommendation to determine which Gatekeeper an endpoint is associated with. The endpoint may multicast (or use other methods as described in Appendix IV/H.225.0) a Gatekeeper Request (GRQ) message, asking "Who is my Gatekeeper?". This is sent to the Gatekeeper's well-known Discovery Multicast Address. One or more Gatekeepers may respond with the Gatekeeper Confirmation (GCF) message indicating "I can be your Gatekeeper.", and return the Transport Address of the Gatekeeper's RAS Channel. If a Gatekeeper does not want the endpoint to register to it, it shall return Gatekeeper Reject (GRJ).

It should be appreciated that FIG. 1 shows the logical communications model between the two administrative domains where no backend services (BES) are considered. BES provide additional value-added services, such as, for example, permanent and/or temporary address resolution/ allocation services, authentication, and others using the database/server not defined in H.323 and also not shown in FIG. 1.

Figure 2:
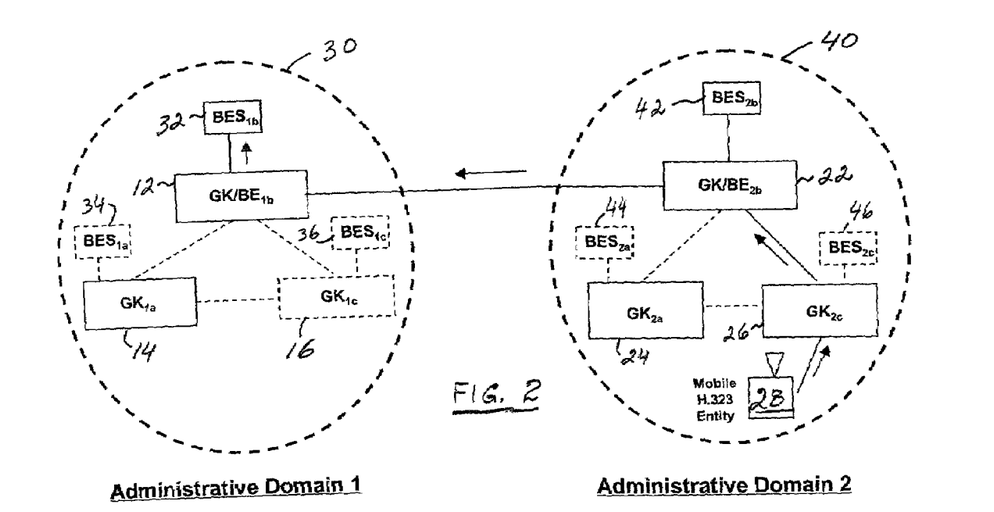
FIG. 2 illustrates another embodiment of the Inter-Domain Mobility Management system of this invention with backend services.

FIG. 2 illustrates another embodiment of the Inter-Domain Mobility Management system of this invention which basically describes the communications flow when the back-end services (BES) (e.g., home location functions (HLFs)) are considered. Like FIG. 1, it is assumed that mobile entity 28 has moved from administrative domain 30 to administrative domain 40 and performs the GK discovery and registers with the $GK_{2c}$ 26 using H.323 procedures as described earlier. The relationships for communications between border elements (BEs) and backend services (BES) (e.g., home location function (HLFs)) and gate keepers (GKs) needs to be done in accordance with H.323 standards. The backend services (BES) of a given administrative domain can equally be accessed by both the gatekeeper (GK) and the border element (BE). However, a user can send the request for any services via the gatekeeper (GK). Upon receipt of a request for backend services the GK will examine the request and will determine that the user has moved from another administrative domain and that the related service information needs to be known from the earlier BES that is not located in this domain 40. Then the gatekeeper (GK) decides how the backend services (BES) can be accessed to another administrative domain using the Border elements (BEs). Depending on the configuration between the administrative domains optimal routing will be provided to optimize the resource utilization. Normally the Border element (BE) is accessed if the services information needs to be resolved from another administrative domain. In this context FIG. 2 shows that the backend services (BES) are being accessed from another administrative domain via the border elements (BEs). As described earlier, a user or mobile H.323 entity 28 needs to send the service request to the GK where the user or H.323 mobile entity has registered. As a result, when the user 28 enters administrative domain 40, the communication is sent to a gatekeeper 26, which routes it to the border element 22. The communication is then sent to border element 12 in administrative domain 30 and then routed to backend services 32. The request that is sent from the mobile user or H.323 mobile entity 28 located in administrative domain 40 to the $BES_{1b}$ 32 via GK 26, BE 22, and BE 12, is resolved in BES 32 of administrative domain 30 and, a reply is sent back by the BES 32 to the mobile entity 28 via BE 12, BE 22, and GK 26. Administrative domain 30 will have a plurality of gatekeepers 14, 16 and backend services 34 ($BES1_a$), 36 ($BES_{1c}$). Similarly, the Administrative domain 40 will have a plurality of gatekeepers 24, 26 and backend services 42 ($BES_{2b}$), 44 ($BES_{2a}$), 46($BES_{2c}$). In the same token, there can be a plurality of border elements (BEs) in each administrative domain and has not been shown for simplicity. However, FIG. 2 also shows that the backend services (BES) (e.g., home location functions (HLFs)) information resolution is provided from another administrative domain for an H.323 mobile entity if the information is not available in a given administrative domain.

Figure 3:
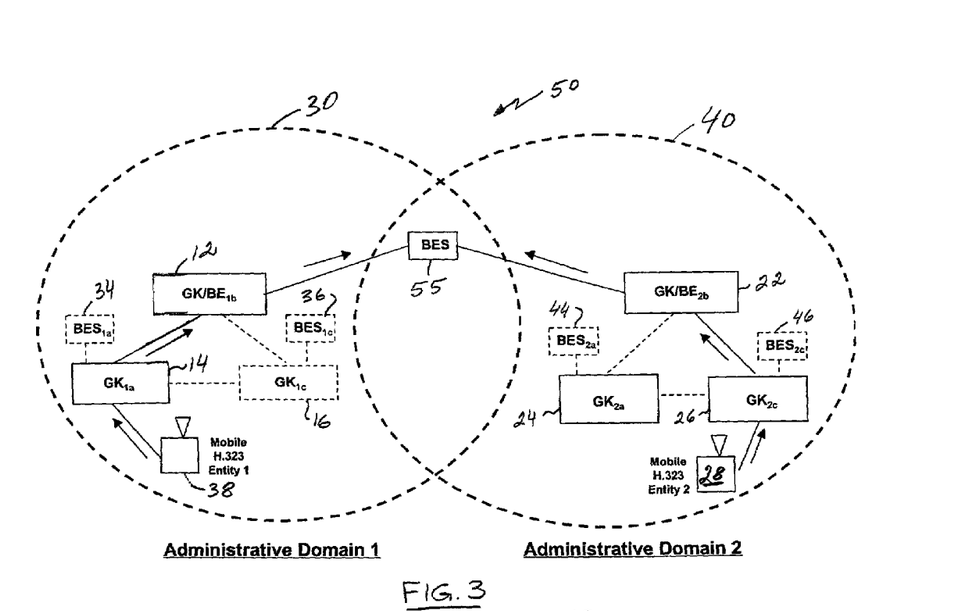
FIG. 3 illustrates yet another embodiment of the Inter-Domain Mobility Management system of this invention where requests are resolved by the backend server shared among multiple administrative domains.

FIG. 3 illustrates yet another embodiment of the Inter-Domain Mobility Management system of this invention where the backend services (BES) (e.g., home location function (HLFs)) overlap or are common to both the administrative domains, and where requests are resolved by the backend server shared among multiple administrative domains. FIG. 3 shows a configuration 50 where a given back end services (BES) server 55 is being shared or is common between the two administrative domains, namely, administrative domain 30 and administrative domain 40. It should also be noted that there may be other back end services (BES) servers in those domains whose services are not being shared. As a result, the services from the non-sharing back end services (BES) server has to be accessed using the normal procedure of the H.323 protocol via gatekeepers (GKs) and/or border elements (BEs). Also shown is a mobile H.323 entity 38.in the administrative domain that would also be sharing the back end services (BES) server 55, and getting similar information whether it is within the home domain or in a foreign domain.

Figure 4:
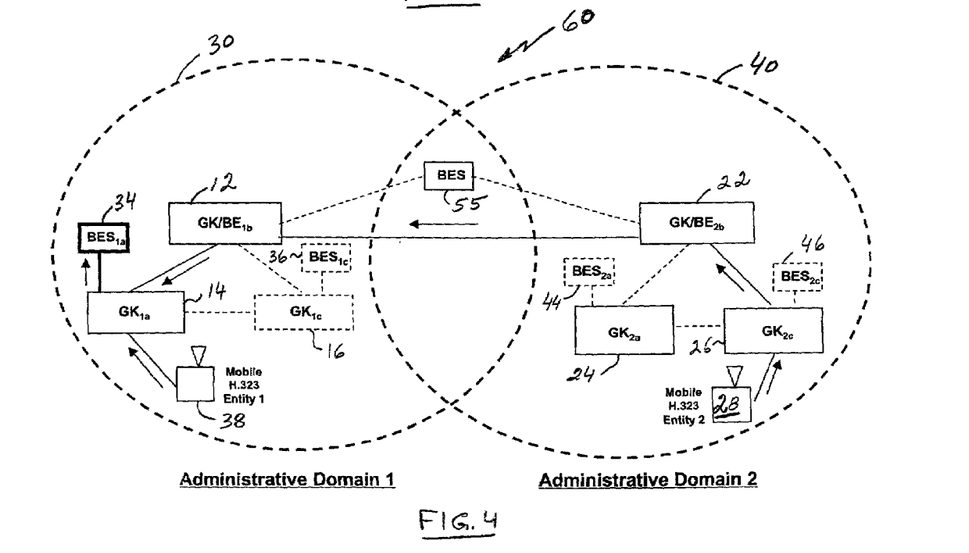
FIG. 4 illustrates still another embodiment of the Inter-Domain Mobility Management system of this invention where requests are resolved by the backend server not shared among multiple administrative domains.

FIG. 4 illustrates still another embodiment of the Inter-Domain Mobility Management system of this invention showing the accessing of a non-sharing back end services (BES) server in two overlapping administrative domains. The non-shared backend services (BES) server (e.g., $BES_{1a}$ 34) needs to be accessed although a given back end services (BES) server (or servers) may be shared because of the overlapping administrative domains, and where requests are resolved by the backend server not shared among multiple administrative domains. FIG. 4 also illustrates how the inter-domain communication needs to be done in the context of H.323 communications protocol. The H.323 signaling messages for inter-domain communications flows from the border element (BEs) 22, to the border element 12 between the administrative domains 40, 30, as discussed earlier. However, the backend services (BES) from a back end services (BES) server that reside behind a gate keeper (GK) and/or a border element (BE) may be accessed via the gate keeper (GK) and/or border element (BE) as appropriate. The non-shared backend services (BES) server $BES_{1a}$ 34 is then accessed although the gatekeeper 14. However, it should be understood that a given back end services (BES) server (or servers) may be shared because of the overlapping administrative domains, and where requests are resolved by the backend server and are not shared among multiple administrative domains. The services from a back end server (BES) 34 can only be requested by an H.323 endpoint 28, 38 via a gate keeper (GK) 14 (because a border element (BE) is not directly accessible by an H.323 endpoint (e.g., terminal, GW (gateway)). Furthermore, the mobile entity 28, 38 moves from one place to another and may not be aware whether it is attached to its home network address, home zone, and/or home domain. It is expected that the MGA (mobile gatekeeper advertisement) message that helps to discover the gatekeeper (GK) for the mobile entity to receive services for receiving or sending calls will provide this information or some other mechanisms will help the mobile H.323 entity to discover that it is in a new administrative domain. When the mobile entity is in a foreign (visiting) administrative domain, it may so happen that there is a need to verify mobile entity's profile for proper identification, authorization, and other purposes from its home domain. If a mobile entity does not need to verify its profile from its home domain, there is almost no need for any new standard work in H.323 for mobility because re-registration mechanisms that exits in H.323 may be sufficient for this purpose.

Inter-zone communications and the inter-domain communications will also need the following: (a) Gate-keeper (GK) discovery and identification whether it is in its home domain or in foreign domain, (b) Registration with the gate keeper (GK), (c) Location updates, (d) Smooth location updates, (e) Call establishment.

Communications between the administrative domains are done via border elements (BEs) and gate-keepers (GKs) when there are back end services (BES) servers as discussed earlier. The back end services (BES) server resides behind the gate-keepers (GKs) and border elements (BEs). The home location function (HLF) and visitor location function (VLF) are also considered as back end services (BES) servers that are used for storage of information related to mobility. The relationship between the border elements (BEs), home location function (HLFs), visitor location function (VLFs), and gate keepers (GKs) for H.323 communications protocol is the same as described in the context of Back end services (BES) servers.

Figure 5:
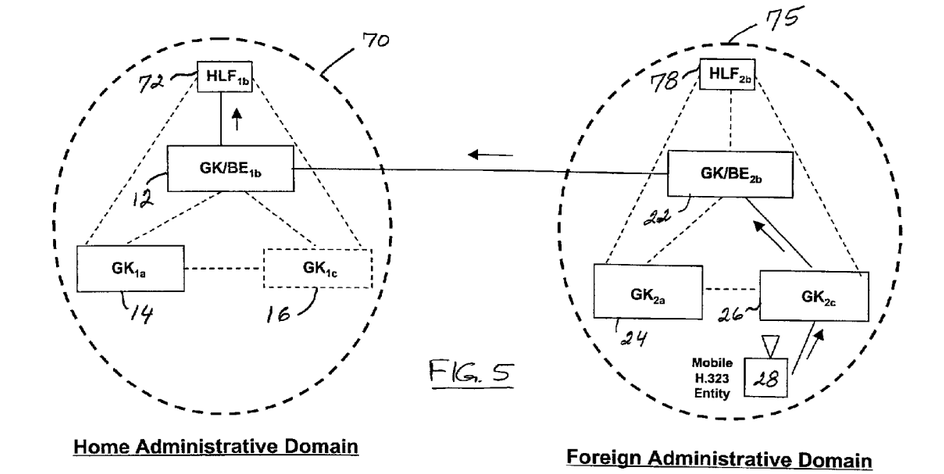
FIG. 5 illustrates yet another embodiment of the Inter-Domain Mobility Management system of this invention using centralized home location function servers/databases.

FIG. 5 illustrates yet another embodiment of the Inter-Domain Mobility Management system of this invention using a centralized home location function (HLF) server/database. FIG. 5 also shows the communications flows when a mobile entity moves from one administrative domain to another where each domain has only one home location function (HLF) configured in a centralized architecture. In this embodiment the mobile entity discovers the gatekeeper ($GK_{2c}$) and finds that its is in a foreign (visiting) domain. Then the mobile entity proceeds with registration with the gatekeeper (GK) (GK2c). The gatekeeper (GK2c) finds that mobile H.323 entity 28 is a visitor and keeps the information in the visitor location function (VLF) (not shown in FIG. 5 for simplicity). There can be some communications between the visitor location function (VLF), GK2c, and HLF2b to find out if mobile H.323 entity 28 is a visitor from another domain (similar one described in R. R. Roy, AT&T, "H.323 Inter-Zone Mobility Management," MD018, Ad Hoc Mobility Conference Call, February–May 2000, the disclosure of which is entirely incorporated herein by reference, in the context of inter-zone mobility management), and the communication flow between gatekeeper and gatekeeper from or within one s domain has not been shown in FIG. 5 for simplicity. Then, GK2c 26 contacts the border element (GK/BE2b) 22 to contact the administrative domain 75 for verifying the visitor's profile. The border element (GK/BE2b) 22 of the foreign domain 75 being unable to provide the information related to the mobile H.323 entity 28 then contacts the border element (GK/BE1b) 12 of mobile entity's home domain 70. There is only one home location function (HLF) 72 in the home administrative domain 70 because of the centralized configuration, and GK/BE1b 12 communicates with HLF1b 72 directly to verify the profile of the mobile entity 28 that is currently residing in administrative domain 75. The information is then sent back from the home domain 70 to the foreign (visiting) administrative domain 75 after verifying the profile of the mobile entity 28. (These information flows are not shown in FIG. 5 for simplicity.) Administrative domain 75 may have additional home location functions HLF2b (78) that may be available for additional information.

Figure 6:
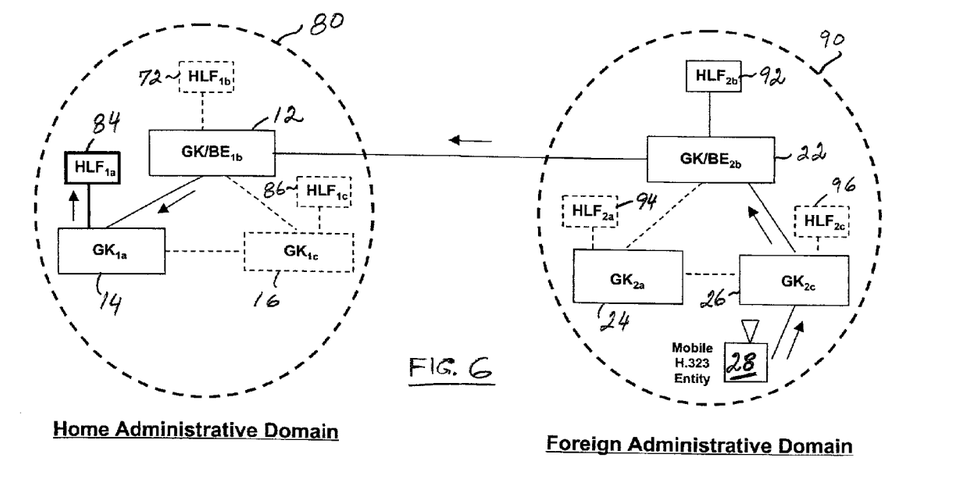
FIG. 6 illustrates still another embodiment of the Inter-Domain Mobility Management system of this invention using distributed home location function servers/databases.

FIG. 6 illustrates still another embodiment of the Inter-Domain Mobility Management system of this invention showing the inter-domain communication flow using distributed home location function (HLF) servers/databases. FIG. 6 also shows a configuration for communications between the two administrative domains where the home location function (HLF) function is distributed in a domain. The communications scenarios are almost similar as shown in FIG. 5, but with the difference that a gate-keeper (GK) has the intelligence to decide which home location function (HLF) is needed to be accessed for resolving the information. However, how the decision is made by the gate-keeper (GK) for contacting a particular gate keeper (GK) and/or home location function (HLF) is not the subject of standardization. For example, when the border element (GK/BE2b) 22 of the foreign (visiting) domain 75 communicates with border element (GK/BE1b) 12 of the home administrative domain 70, GK/BE1b 12 decides that this particular mobile entity 28 is managed by GK1a 14 and contacts GK1a 14. The gatekeeper (GK1a) 14 will then communicate with HLF1a 84 to verify the profile of the mobile entity 28 that is currently residing in a foreign domain 90. The information relating to the mobile entity 28 that is obtained is then routed back from the home administrative domain 80 to the foreign administrative domain 90. This information relating to the mobile entity 28 may be temporarily or permanently stored in HLF2b 92 in the foreign administrative domain 90. Both administrative domains 80 and 90 may have additional home location functions HLF1c (86), HLF2a (94), HLF2b (92), HLF2c (96) that may be available for additional information.

It may be noted that the communications between the visitor location function (VLF) and home location function (HLF) after registration of the mobile entity in a visiting (foreign) domain in view of the distributed Home location function (HLF) will be almost similar to that described in AT&T's contribution for inter-zone mobility management, namely, R. R. Roy, AT&T, "H.323 Inter-Zone Mobility Management," MD018, Ad Hoc Mobility Conference Call, February–May 2000, the disclosure of which is entirely incorporated herein by reference.

In R. R. Roy, AT&T, AH.323 "Mobile Communications Environments and Intra-Zone Mobility Management," MD017, Ad Hoc Mobility Conference Call, February–May 2000, and R. R. Roy, AT&T, "Needs for Creation of New Mobility Binding Messages Exclusively for H.323 Mobility Management", APC-1769, SG16, Q.13/16, WP2, Osaka, Japan, May 15–19, 2000, the disclosures of which are entirely incorporated herein by reference, it has been explained why there is a need for creation of separate signaling messages for mobility binding and updating in addition to extensions of existing messages to support mobility. The characteristics of the mobility binding and updating messages are such that the existing H.323 signaling messages do not have the properties to satisfy those requirements. The new mobility binding and updating messages proposed in contribution, such as, R. R. Roy, AT&T, "H.323 Mobility Architecture and Protocol for Terminal, User, and Service Mobility," D-354, ITU-T SG 16 Q.13/16, WP2, Geneva, Switzerland, Feb. 7–18, 2000, the disclosure of which is entirely incorporated herein by reference, can also be used for inter-domain communications.

However, the existing accessRequest and other messages of H.225.0 Annex G, for inter-administrative domain communications also need to be extended to support mobility. It may be noted that we still need to create new messages for mobility binding and updating as suggested in R. R. Roy, AT&T, "H.323 Mobility Architecture and Protocol for Terminal, User, and Service Mobility," D-354, ITU-T SG 16 Q.13/16, WP2, Geneva, Switzerland, Feb. 7–18, 2000, the disclosure of which is entirely incorporated herein by reference.

The new messages that support mobility binding and updating has been proposed in R. R. Roy, AT&T, "H.323 Mobility Architecture and Protocol for Terminal, User, and Service Mobility," D-354, ITU-T SG 16 Q.13/16, WP2, Geneva, Switzerland, Feb. 7–18, 2000, the disclosure of which is entirely incorporated herein by reference. The same messages can be used for both intra-domain and inter-domain communications. For inter-domain communications additional message headers like hopcount and others need to be added.

Like LRQ (Location Request), we also need to extend the accessRequest and few other messages to indicate where the RAS (Registration, Admission, and Status) and call signaling addresses need to be sent for the mobile entity while the mobile entity will move from one place to another. Moreover, a mechanism that allows whether the mobile entity will let others know its actual location other than its original home network address for a single, multiple or all media (may be based subscription policy like security or otherwise) while it is in a foreign domain is also need to be kept as an option.

It has clearly been articulated how the inter-domain communications need to be made to manage mobile entity users that conforms the existing H.323 standard. In particular, it has been shown that the relationship and communications flows among the border elements (BEs), gate keepers (GKs), home location function (HLFs), and visitor location function (VLFs) considering the following:

(a) Border elements (BEs) can be configured as centralized, distributive, and/or hybrid architecture.

(b) Gatekeepers (GKs) can have any architectural relationships: centralized, distributive, and/or hybrid architecture.

(c) Home location function (HLFs) that are considered as the backend servers behind the Border elements (BEs) and Gate keepers (GKs) can also be arranged in any architectural relationship with respect to the Border elements (BEs) and Gate keepers (GKs): centralized, distributive, and/or hybrid architecture.

(d) The administrative domains can also be arranged logically among themselves in any form: centralized, distributive, and/or hybrid architecture.

(e) The overlapping administrative domains that can have the shared backend services (e.g., Home location function (HLF)).

The inter-domain communications protocol for mobility management needs to be robust enough to satisfy all probable configurations of all functional entities (e.g., border elements (BEs), gate keepers (GKs), home location function (HLFs), visitor location function (VLFs), zones, domains) whether each architectural element is configured as centralized, distributed, and/or hybrid manner. However, the back end services (BES) server (e.g., home location function (HLF)) to back end services (BES) (e.g., home location function (HLF)) server communications protocol is not the scope of H.323.

The invention provides a framework how the inter-domain communications need to be done in H.323 for mobility management. It has been shown the communication flows for mobility management considering the border elements (BEs), gate keepers (GKs), home location function (HLFs), and domains where each entity can be arranged in any logical architectural relationship: centralized, distributed, and/or hybrid architecture.

In addition, the messages like accessRequest and other are also need to be extended to let know the RAS and the call signaling addresses of the mobile entity while it is visiting a foreign domain. Furthermore, it is the critical need for a mobile entity to have an option whether it will let others to know its present location in a foreign domain while it is away from its home domain because the communications can also be done via its home network address that it may want make to public.

This invention also shows various relationships for communications between border elements (BEs), home location function (HLFs), visitor location function (VLFs), and gate keepers (GKs).

H.225.0 Annex G provides the communications between the administrative domains via the border elements (BEs). A domain may have one or more border elements (BEs) while these border elements (BEs) may have the logical relationship, such as, (a) centralized, (b) distributed, or (c) hybrid architecture.

A Border element (BE) is usually co-located with a gatekeeper (GK). If they are not co-located, the communications between the border element (BE) and the gatekeeper (GK) will be done using the H.225.0 RAS signaling messages (e.g., LRQ/LCF/LRJ) for the address resolution and location update.

However, it is felt that it would be more efficient to use the H.225.0 Annex G messages between the gatekeepers (GKs) as well as between the gatekeeper (GK) and the border element (BE).

Furthermore, the administrative domains can also be arranged among themselves, such as (a) centralized, (b) distributed, or (c) hybrid.architectural relationship from logical communications point of view.

There may also be overlapping administrative domains and more than one administrative domain that may be able to resolve a given address.

A border element (BE) element configures itself with all address information obtaining the address templates in the following ways (a) static configuration with explicit provisioning with address templates for all zones for which it is responsible, (b) receiving descriptors containing the address information from other border elements (BEs) in response to general requests, and (c) receiving responses to specific queries.

It is important to understand that home location function (HLFs)/visitor location function (visitor location function (VLFs)) can be accessed equally by border elements (BEs) and gatekeepers (GKs). However, a mobile entity can only communicate with the gatekeeper (GK) directly (not the border element (BE)).

The H.323-based mobility registers with the H.323 Visiting/Foreign Gatekeeper including sending registration information for the Mobile Terminal/Node/Entity using a Base Station to Base Station Controller to Mobile Switching Center to H.323 Visiting/Foreign Gatekeeper system. Wherein registering with the at least one H.323 Visiting/Foreign Gatekeeper includes sending registration information for the Mobile Terminal/Node/Entity using a wireless/wire-line Local Area Network to Router/Switch to H.323 Visiting/Foreign Gatekeeper system. Furthermore, the registering includes the steps of: broadcasting/multicasting/unicasting /sending, by the Home Gatekeeper, a Mobility Gatekeeper Advertisement (MGA) message periodically; broadcasting/multicasting/unicasting/sending a registration request message (RRQ) to the Home Gatekeeper by the Mobile Terminal/Node/Entity; and sending, by the Home Gatekeeper, a registration confirmation/registration rejection (RCF/RRJ) to the Mobile Terminal/Node/Entity. The registering steps can also include the steps of: upon determining, by the Mobile Terminal/Node/Entity, that a network point of attachment has changed/a foreign zone has been entered, broadcasting/multicasting/unicasting /sending, by the Mobile Terminal/Node/Entity, a registration request message (RRQ) to a Foreign/Visiting Gatekeeper; broadcasting/multicasting/unicasting /sending, by the Foreign/Visiting Gatekeeper, a binding update message (BURQ) to the Home Gatekeeper; broadcasting/multicasting/unicasting/sending, by the Home Gatekeeper, a binding update confirmation/rejection (BuCF/BuRJ) to the Foreign/Visiting Gatekeeper; broadcasting/multicasting/unicasting/sending, by the Foreign/Visiting Gatekeeper, the binding update confirmation/rejection to the Mobile Terminal/Node/Entity.

The H.323-based mobility would also include a situation wherein, where the Mobile Terminal/Node/Entity has already visited another zone regulated by a Visited Gatekeeper within the first administrative domain, registering includes: broadcasting/multicasting/unicasting/sending, by the Home Gatekeeper, a mobility unbinding message (UbRQ) to the Visited Gatekeeper; and broadcasting/multicasting/unicasting/sending, by the Visited Gatekeeper, a mobility unbinding confirmation/rejection (UbCF/UbRJ) to the Home Gatekeeper. Or, where the H.323-based Mobile Terminal/Node/Entity has already visited another zone regulated by a Visited Gatekeeper within the first administrative domain, registering would include:

broadcasting/multicasting/unicasting/sending, by the Mobile Terminal/Node/Entity, a registration request message (RRQ) to a Foreign/Visiting Gatekeeper; broadcasting/multicasting/unicasting/sending, by the Foreign/Visiting Gatekeeper, a mobility unbinding update message (UbRQ) to the Visited Gatekeeper; broadcasting/multicasting/unicasting/sending, by the Visited Gatekeeper, a mobility unbinding confirmation/rejection (UbCF/UbRJ) to the Foreign/Visiting Gatekeeper; broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BuRQ) to the Home Gatekeeper; and broadcasting/multicasting/unicasting/sending, by the Home Gatekeeper, a binding update confirmation/rejection (BuCF/BuRJ) to the Foreign/Visiting Gatekeeper.

The H.323-based Mobile Terminal/Node/Entity having already visited another zone regulated by a Visited Gatekeeper within the first administrative domain, and wherein registration could include:

broadcasting/multicasting/unicasting/sending, by the Mobile Terminal/Node/Entity, a registration request message (RRQ) to a Foreign/Visiting Gatekeeper; broadcasting/multicasting/unicasting/sending, by the Visited Gatekeeper, a mobility unbinding confirmation/rejection (UbCF/UbRJ) to the Foreign/Visiting Gatekeeper; broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BuRQ) to the Home Gatekeeper; broadcasting/multicasting/unicasting/sending, by the Home Gatekeeper, a binding update confirmation/rejection (BuCF/BuRJ) to the Foreign/Visiting Gatekeeper; broadcasting/multicasting/unicasting/sending, by the Home Gatekeeper, a mobility unbinding update message (UbRQ) to the Visited Gatekeeper; and broadcasting/multicasting/unicasting/sending, by the Visited Gatekeeper, a mobility unbinding confirmation/rejection (UbCF/UbRJ) to the Home Gatekeeper.

The H.323-based mobility wherein at least one Visiting/Foreign Gatekeeper utilizes a combined HomeVisitor Location Database. The H.323-based mobility wherein a plurality of Visiting/Foreign Gatekeepers each utilize an individual Visitor Location Database and share a Home Location Database. The H.323-based mobility wherein the communication utilizes an Internet Protocol.

This invention provides a communication link between a telephone device and/or another telephone device(s) and/or server(s). It also allows for programming a telephone device to accept or reject communications between administrative domains. This invention also allows a mobile entity unit to be in communication with a telephone network, especially when a user moves between different administrative domains.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An inter-domain mobility management method, comprising:
   (a) a mobile H.323.entity communicating information related to the mobile entity with a first gatekeeper in a first administration domain;
   (b) said first gatekeeper being unable to verify information on said mobile H.323 entity and sending information to a first border element within said first administration domain;
   (c) said first border element communicating information with a second border element in a second administrative domain to resolve said information related to the mobile entity;
   (d) said second border element communicates back with said first border element with information to resolve said information related to the mobile entity;
   (e) said second border element accepting said resolved information related to the mobile entity and communicates said information with said mobile H.323 entity via said first gatekeeper.

2. The method of claim 1 wherein said information received by said first gatekeeper is transferred to a second gatekeeper within said first administrative domain.

3. The method of claim 1 wherein said second administrative domain is the home administrative domain for said mobile H.323 entity.

4. The method of claim 1 wherein said first administrative domain is a serving, visiting, visited or foreign administrative domain for said mobile H.323 entity.

5. The method of claim 1 wherein said first gatekeeper requests said information related to the mobile entity to register, authenticate, verify, resolve, allocate resources to said mobile H.323 entity.

6. An inter-domain mobility management method, comprising:
   (a) a mobile H.323 entity communicating information related to the mobile entity with a first gatekeeper in a first administrative domain having a first backend services;
   (b) said first gatekeeper being unable to verify information on said mobile H.323 entity and sending information to a first border element within said first administrative domain;

(c) said first border element communicating information with a second border element in a second administrative domain to resolve said information related to the mobile entity;

(d) said second border element obtains information from a second backend services in said second administrative domain and communicates back with said first border element with information to resolve said information related to the mobile entity;

(e) said second border element accepting said resolved information related to the mobile entity and communicates said information with said mobile H.323 entity via said first gatekeeper.

7. The method of claim 6 wherein said information received by said first gatekeeper is transferred to a second gatekeeper within said first administrative domain.

8. The method of claim 6 wherein said second administrative domain is the home administrative domain for said mobile H.323 entity.

9. The method of claim 6 wherein said first administrative domain is a serving, visiting, visited or foreign administrative domain for said mobile H.323 entity.

10. The method of claim 6 wherein said first gatekeeper requests said information related to the mobile entity to register, authenticate, verify, resolve, allocate resources to said mobile H.323 entity.

11. The method of claim 6, wherein information obtained from said second backend services is stored within said first backend services.

12. The method of claim 6 wherein information obtained from said second backend services is stored within said first backend services and wherein subsequently said first backend services provides home location functions.

13. The method of claim 6 wherein information obtained from said second backend services is stored within said first backend services and wherein subsequently said first backend services provides home location functions, and wherein said home location functions provides services selected from a group consisting of address, registration, verification, resolution, allocation and authentication.

14. An inter-domain mobility management method, comprising:

(a) a mobile H.323. entity communicating information related to the mobile entity with a first gatekeeper in a first administration domain having a first backend services;

(b) said first gatekeeper being unable to verify information on said mobile H.323 entity and sending information to a first border element within said first administration domain;

(c) said first border element communicating information with a first backend services to resolve said information related to the mobile entity, wherein said first backend services is shared with both said first administrative domain and a second administrative domain;

(d) said second border element obtains information from said first backend services in said first and said second administrative domain and communicates it back to said first border element with information to resolve said information related to the mobile entity;

(e) said second border element accepting said resolved information related to the mobile entity and communicates said information with said mobile H.323 entity via said first gatekeeper.

15. The method of claim 14 wherein said information received by said first gatekeeper is transferred to a second gatekeeper within said first administrative domain.

16. The method of claim 14 wherein said second administrative domain is the home administrative domain for said mobile H.323 entity.

17. The method of claim 14 wherein said first administrative domain is a serving, visiting, visited or foreign administrative domain for said mobile H.323 entity.

18. The method of claim 14 wherein said first gatekeeper requests said information related to the mobile entity to register, authenticate, verify, resolve, allocate resources to said mobile H.323 entity.

19. The method of claim 14 wherein a mobile H.323 entity in said first administrative domain communicates with said first backend services.

20. An inter-domain mobility management method, comprising:

(a) a mobile H.323.entity communicating information related to the mobile entity with a first gatekeeper in a first administration domain having a first backend services;

(b) said first gatekeeper being unable to verify information on said mobile H.323 entity and sending information to a first border element within said first administration domain;

(c) said first border element communicating information with a second border element in a second administrative domain to resolve said information related to the mobile entity;

(d) said second border element obtains information from a second backend services in said second administrative domain via at least one gatekeeper in said second administrative domain and communicates back with said first border element with information to resolve said information related to the mobile entity;

(e) said second border element accepting said resolved information related to the mobile entity and communicates said information with said mobile H.323 entity via said first gatekeeper.

21. The method of claim 20 wherein said information received by said first gatekeeper is transferred to a second gatekeeper within said first administrative domain.

22. The method of claim 20 wherein said second administrative domain is the home administrative domain for said mobile H.323 entity.

23. The method of claim 20 wherein said first administrative domain is a serving, visiting, visited or foreign administrative domain for said mobile H.323 entity.

24. The method of claim 20 wherein said first gatekeeper requests said information related to the mobile entity to register, authenticate, verify, resolve, allocate resources to said mobile H.323 entity.

25. An inter-domain mobility management method, comprising:

(a) a mobile H.323.entity communicating information related to the mobile entity with a first gatekeeper in a first administration domain having a first location function;

(b) said first gatekeeper being unable to verify information on said mobile H.323 entity and sending information to a first border element within said first administration domain;

(c) said first border element communicating information with a second border element in a second administrative domain to resolve said information related to the mobile entity;

(d) said second border element obtains information from a second home location function in said second administrative domain and communicates back with said first border element with information to resolve said information related to the mobile entity;

(e) said second border element accepting said resolved information related to the mobile entity and communicates said information with said mobile H.323 entity via said first gatekeeper.

26. The method of claim 25 wherein said information received by said first gatekeeper is transferred to a second gatekeeper within said first administrative domain.

27. The method of claim 25 wherein said second administrative domain is the home administrative domain for said mobile H.323 entity.

28. The method of claim 25 wherein said first administrative domain is a serving, visiting, visited or foreign administrative domain for said mobile H.323 entity.

29. The method of claim 25 wherein said first gatekeeper requests said information related to the mobile entity to register, authenticate, verify, resolve, allocate resources to said mobile H.323 entity.

30. The method of claim 25 wherein information obtained from said second home location function is stored within said first home location function.

31. The method of claim 25 wherein information obtained from said second home location function is stored within said first home location function and wherein subsequently said first home location function provides home location functions.

32. The method of claim 25 wherein information obtained from said second home location function is stored within said first home location function and wherein subsequently said first home location function provides home location functions, and wherein said home location functions provides services selected from a group consisting of address, registration, verification, resolution, allocation and authentication.

33. An inter-domain mobility management method, comprising:

(a) a mobile H.323.entity communicating information related to the mobile entity with a first gatekeeper in a first administration domain having a first location function;

(b) said first gatekeeper being unable to verify information on said mobile H.323 entity and sending information to a first border element within said first administration domain;

(c) said first border element communicating information with a second border element in a second administrative domain to resolve said information related to the mobile entity;

(d) said second border element obtains information from a second home location function in said second administrative domain via at least one gatekeeper in said second administrative domain and communicates back with said first border with information to resolve said information related to the mobile entity;

(e) said second border element accepting said resolved information related to the mobile entity and communicates said information with said mobile H.323 entity via said first gatekeeper.

34. The method of claim 33 wherein said information received by said first gatekeeper is transferred to a second gatekeeper within said first administrative domain.

35. The method of claim 33 wherein said second administrative domain is the home administrative domain for said mobile H.323 entity.

36. The method of claim 33 wherein said first administrative domain is a serving, visiting, visited or foreign administrative domain for said mobile H.323 entity.

37. The method of claim 33 wherein said first gatekeeper requests said information to the mobile entity to o register, authenticate, verify, resolve, allocate resources to said mobile H.323 entity.

38. The method of claim 33 wherein information obtained from said second home location function is stored within said first home location function.

39. The method of claim 33 wherein information obtained from said second home location is stored within said first home location function and wherein subsequently said first home location function provides home location functions.

40. The method of claim 33 wherein information obtained from said second home location function is stored within said first home location function and wherein subsequently said first home location function provides home location functions, and wherein said home location functions provides services selected from a group consisting of address, registration, verification, resolution, allocation and authentication.

* * * * *